(12) United States Patent
West et al.

(10) Patent No.: US 11,946,794 B2
(45) Date of Patent: Apr. 2, 2024

(54) SYSTEMS FOR RETAINING AND WEIGHING VARIOUSLY CONFIGURED CONTAINERS

(71) Applicant: Fenwal, Inc., Lake Zurich, IL (US)

(72) Inventors: Richard West, Lake Villa, IL (US); Alexandra Salomon, Chicago, IL (US)

(73) Assignee: Fenwal, Inc., Lake Zurich, IL (US)

( * ) Notice: Subject to any disclaimer, the term of this patent is extended or adjusted under 35 U.S.C. 154(b) by 350 days.

(21) Appl. No.: 17/482,703

(22) Filed: Sep. 23, 2021

(65) Prior Publication Data

US 2022/0099477 A1 Mar. 31, 2022

Related U.S. Application Data

(60) Provisional application No. 63/084,615, filed on Sep. 29, 2020.

(51) Int. Cl.
*G01G 19/18* (2006.01)
*G01G 17/04* (2006.01)
*G01G 21/28* (2006.01)

(52) U.S. Cl.
CPC ............. *G01G 19/18* (2013.01); *G01G 17/04* (2013.01); *G01G 21/28* (2013.01)

(58) Field of Classification Search
CPC ......... G01G 19/18; G01G 17/04; G01G 21/28
See application file for complete search history.

(56) References Cited

U.S. PATENT DOCUMENTS

| 4,712,567 | A | 12/1987 | Gille et al. | |
|---|---|---|---|---|
| 9,000,311 | B1* | 4/2015 | Collins | B66C 1/40 177/132 |
| 2003/0048185 | A1* | 3/2003 | Citrenbaum, M.D. | A61M 5/16895 340/613 |
| 2008/0027409 | A1* | 1/2008 | Rudko | A61M 5/142 604/503 |
| 2017/0328763 | A1* | 11/2017 | Parker | G01G 17/04 |
| 2018/0245967 | A1* | 8/2018 | Parker | A61B 5/208 |
| 2022/0193375 | A1* | 6/2022 | Rehm | G01G 17/04 |
| 2022/0260408 | A1* | 8/2022 | Madsen | G01G 23/16 |

FOREIGN PATENT DOCUMENTS

DE 30 19 284 A1 11/1981
WO WO 2021/011721 A1 1/2021

OTHER PUBLICATIONS

Extended European Search Report for EP 21198419.0 dated Feb. 10, 2022.
Communication pursuant to Article 94(3) EPC dated Aug. 10, 2023, for the related European Patent Application No. 21 198 419.0.

* cited by examiner

*Primary Examiner* — Randy W Gibson
(74) *Attorney, Agent, or Firm* — Cook Alex Ltd.

(57) ABSTRACT

A weigh scale for use with a fluid processing system including a reusable hardware component and a single use fluid circuit having a plurality of containers interconnected by a plurality of tubing segments. The weigh scale includes a load cell, a bracket secured to the load cell, and a container support clip secured to a connection shaft. The upper end of the connection shaft is configured to be received in the bracket so as to permit the container support clip to self-center with respect to the bracket.

20 Claims, 7 Drawing Sheets

SYSTEMS FOR RETAINING AND WEIGHING VARIOUSLY CONFIGURED CONTAINERS

CROSS-REFERENCE TO RELATED APPLICATION

This application claims the benefit of U.S. Provisional Patent Application No. 63/084,615, filed Sep. 29, 2020, which is expressly incorporated herein by reference in its entirety.

TECHNICAL FIELD

The present disclosure is generally directed to systems for weighing containers used during the processing of suspensions of cells.

BACKGROUND

A number of well-known therapies are currently practiced with a fluid processing system in which a targeted cellular blood component (for example, red blood cells, white blood cells, and platelets) is separated from whole blood and stored for later infusion to a patient. The targeted cell product (for example, red blood cells, white blood cells, or platelets) may be in a suspension that includes plasma and/or some other supernatant. As such, it is sometimes desirable to "wash" the cellular suspension (typically with a physiologic buffer) to remove the plasma/supernatant, as well as any non-target cellular material, prior to reinfusion.

Systems and methods for fluid processing and cell washing are exemplified by US Publication Nos. 2013/0341291, 2013/0092630, 2014/0199680 and 2021/0046426, each of which is incorporated herein by reference. Each of these published applications discloses cell washing methods utilizing a disposable fluid circuit including a spinning membrane separator and a reusable processing machine.

The fluid circuits for these systems comprise a plurality of fluid containers, a number of which are sources of fluids that are being introduced into the fluid circuit. Such containers typically have their associated tubing segments being connected to ports at the bottom of the container, with the containers being supported on their upper ends to help drain all of their contents. Most such containers are designed for this, with a hole or slot from which to hang the container located on the end opposite the port for hanging the container from a hook or other support. When such containers are supported on a weigh scale, the weigh scale is usually sufficiently high so that the tubing hangs downwardly, and there is enough slack in the tubing to mitigate any unloading of the weigh scale that would be caused by the tubing contacting another surface.

The fluid circuits include a "final product container", typically a bag, that is connected to the fluid circuit by a tubing segment. Because the final product container is being filled, the port through which the container is being filled is located at the top of the container to permit the automated removal of air from the container prior to freezing or infusion. As such, the standard hanging holes or slots are often not available, and the associated tubing, if left to gravity, may kink and partially or completely obstruct flow.

The final product container is supported on a weigh scale that is part of the reusable processing machine so that the quantity of final product can be accurately determined. However, depending on how and where the tubing associated with the final product container falls, the tubing (which may be much heavier than an empty container) may exert a force on the bag that impacts the accuracy of the weigh scale as the container fills and re-centers, making the tare value for the container less applicable.

If users, observing this phenomenon, wrap or drape the tubing about some other feature, the container may unintentionally be lifted, which also would impact the accuracy of any weighing and result in much variance between procedures or users. Tubing diameters and materials also may vary, further introducing complications in securely holding the tubing to constrain the container and/or to prevent the tubing from being in the way of performing other aspects of the procedure.

Thus, controlling the tubing segment connected to the final product container in a consistent way is important to accurately weigh the final product container.

Because weight is a function of gravity, it is accurately measured only directly in the direction of gravity. If the load is not applied directly above or below the load cell or weigh scale, and in line with the sensing portion, then the applied load creates a moment on the scale or load sensor. While the moment can be calibrated out to make an accurate scale, if the distance between the center of gravity of the container to the support point for the container remains consistent, even miniscule changes in the weight distribution from one container to the next will affect the accuracy of the scale.

Consequently, there remains a need for a system for supporting a container from a scale that will provide accurate weighing for containers or bags of different configurations without a need for recalibrating the scale each time a container is attached.

SUMMARY

In a first aspect, a weigh scale is provided for use with a fluid processing system comprising a reusable hardware component and a single use fluid flow circuit comprising a plurality of containers interconnected by a plurality of tubing segments. The weigh scale comprises a) a load cell; b) a bracket secured to the load cell; and c) a container support clip secured to a connection shaft, the connection shaft having an upper end configured to be received in the bracket so as to permit the container support clip to self-center with respect to the bracket.

In a second aspect, the upper end of the connection shaft is configured to be received in the bracket so as to permit the container support clip to move with two degrees of freedom relative to orthogonal axes located in a horizontal plane of the bracket.

In a third aspect, the upper end of the connection shaft of the weigh scale is further configured to limit rotation of the container support clip about a vertical axis of the connection shaft.

In a fourth aspect, the upper end of the connection shaft of the weigh scale extends outwardly and has a hemispheric-shaped lower portion and an upper portion comprising generally flat, vertically-oriented side walls, and the bracket has complementarily-shaped surfaces for receiving the upper and lower portions of the upper end of the connection shaft, with the hemispheric-shaped lower portion permitting the container support clip to move with two degrees of freedom relative to orthogonal axes located in a horizontal plane of the bracket and the generally flat, vertically-oriented side walls of the upper portion limiting rotation of the container support clip about the vertical axis of the connection shaft.

In a fifth aspect, the container support clip of the weigh scale comprises an internally-threaded aperture and the container support clip is secured to the connection shaft by an externally-threaded retaining screw received by the internally-threaded aperture of the container support clip.

In a sixth aspect, the weigh scale further comprises a mount arm to which the housing is secured, the mount arm being configured to be secured to the reusable hardware component of the fluid processing system.

In a seventh aspect, the weigh scale further comprises a housing having an interior, wherein the load cell is secured to the interior of the housing.

In an eighth aspect, the weigh scale further comprises a housing having an exterior, wherein a tubing retainer is provided on an exterior face of the housing.

In a ninth aspect, the tubing retainer of the weigh scale comprises an upwardly-open tray having a generally U-shaped cross section with the exterior face of the housing, with an open upper end sized to receive a tubing segment and an associated common tubing accessory associated with the tubing segment of the single use fluid flow circuit.

In a tenth aspect, the container support clip of the weigh scale comprises a base, and a movable jaw pivotally secured to the base and biased into engagement with the base.

In an eleventh aspect, the base of the container support clip comprises an internally-threaded aperture and the container support clip is secured to the connection shaft by an externally-threaded retaining screw received by the internally-threaded aperture of the container support clip.

In a twelfth aspect, the container support clip of the weigh scale further comprises a hook.

In a thirteenth aspect, the hook of the weigh scale is formed integrally with the movable jaw of the container support clip and extends upwardly therefrom.

In a fourteenth aspect, the base and the movable jaw of the container support clip have inter-engaging gripping surfaces.

In a fifteenth aspect, the container support clip of the weigh scale further comprises a hook, wherein the hook further comprises a finger that extends upwardly from the movable jaw.

DETAILED DESCRIPTION

A more detailed description of the systems and methods in accordance with the present disclosure is set forth below. It should be understood that the description below of specific devices and methods is intended to be exemplary, and not exhaustive of all possible variations or applications. Thus, the scope of the disclosure is not intended to be limiting, and should be understood to encompass variations or embodiments that would occur to persons of ordinary skill in the art.

Figure 1:
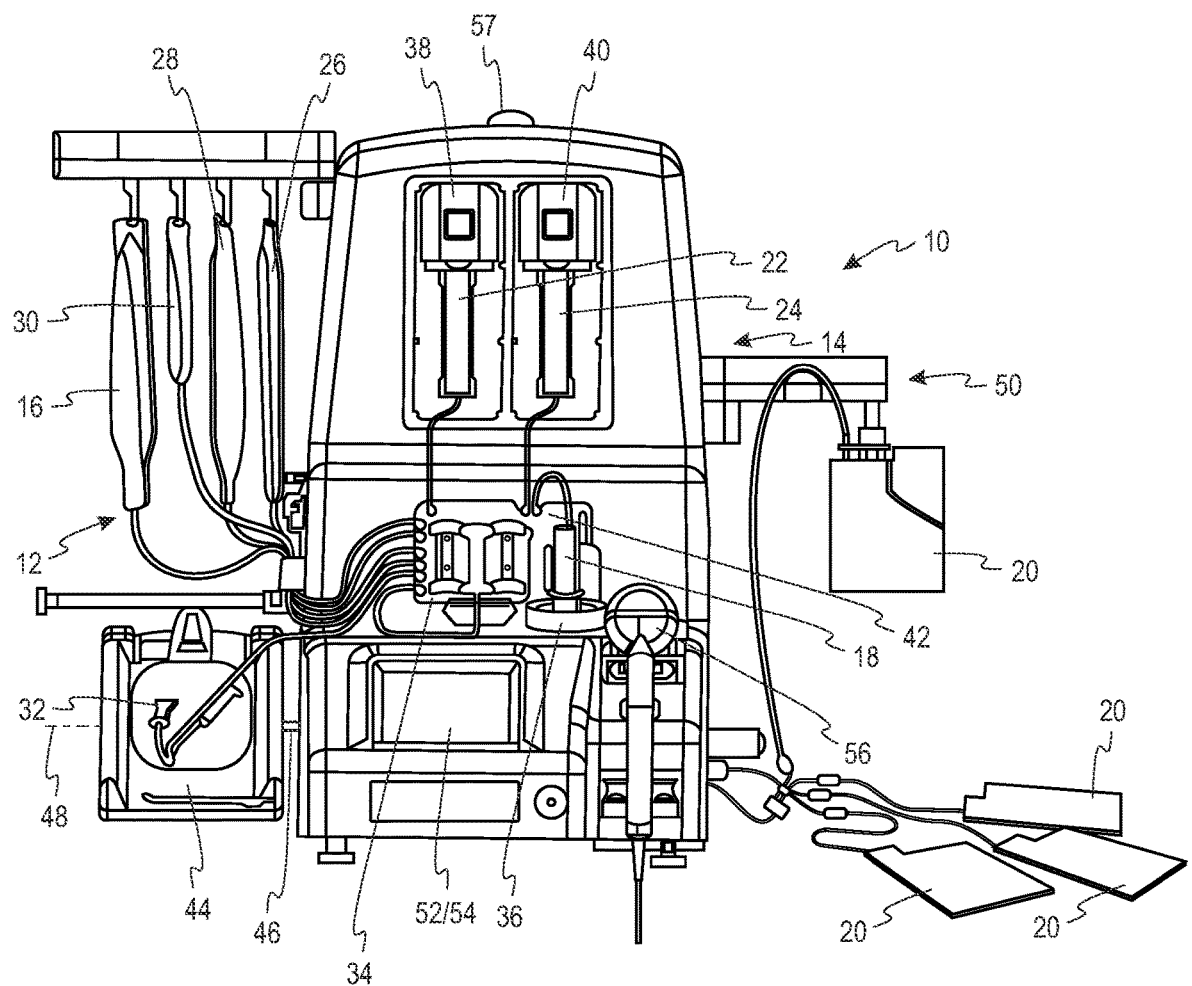
FIG. 1 is a front view of a system for processing small volumes of fluids, such as cellular suspensions including a disposable fluid circuit and a reusable processing machine or hardware in which the reusable fluid processing machine includes a weigh scale having a container support system in accordance with the present disclosure.

Turning first to FIG. 1, an embodiment of a system 10 for processing fluids, such as cell suspensions (for example, cell washing), is illustrated, the system 10 including a disposable fluid circuit (also referred to as a set or kit) 12 and a reusable processing machine, or hardware, 14.

As seen in FIG. 1, the disposable fluid circuit 12 is connectable to a source container 16 of fluid, in particular, biological fluid. The disposable fluid circuit 12 includes a spinning membrane separator 18 that is used to process the fluid received from the source container 16, and to direct a portion of that fluid into one of more product containers 20. These containers may be in the form of flexible bags according to the illustrated embodiment. The flow of fluid from the source container 16, through the spinning membrane separator 18, and to the one or more product containers 20 is achieved through the use of first and second syringes 22, 24, which are in fluid communication with the source container 16, the spinning membrane separator (or spinning membrane for short) 18, and the one or more product containers 20. The syringes 22, 24 also may be in fluid communication with a number of other containers 26, 28, 30, 32.

The flow of the fluid between the containers 16, 20, 26, 28, 30 and 32, the spinning membrane 18, and the syringes 22, 24 is controlled using a flow control cassette 34, which may be connected to each of the foregoing by tubing, or lines. In addition, the cassette 34 may include internal flow paths that are defined in part by a plurality of separate channels or passages, which in turn may be contained within and may be defined by the structure (for example, housing) of the cassette 34. The channels may be connected at a plurality of selectable junctions, which may control the flow of fluid from one channel to another. These selectable junctions also may be referred to as valves, valve stations, or clamps, because, as illustrated, the selectable junctions provide controlled access between the channels. The cassette 34 also may include sensor stations, by which sensors may be associated with the flow paths within the cassette 34 to determine characteristics of the flow therein, such as pressure, presence of air and/or fluid, or optical properties. Preferably, the length of each of the lines and channels is kept as short as possible to further minimize the internal volume of the fluid circuit 12.

The spinning membrane 18 and the syringes 22, 24 may be integrally formed as part of (i.e., as one piece with) the cassette 34, so as to further reduce the tubing volume associated with the kit 12. According to other embodiments, the spinning membrane 18 and/or the syringes 22, 24 may be attached to the remainder of the fluid circuit 12 at the time of use, as may be the case with one or more of the containers 16, 20, 26, 28, 30, 32.

As seen in FIG. 1, the reusable hardware component (or reusable hardware for short) 14 includes a drive 36 for the spinning membrane separator 18, a syringe pump 38, 40 for each syringe 22, 24, and a control cassette interface 42 that is associated with the flow control cassette 34 when the fluid circuit 12 is disposed on the hardware 14 (for example, is mounted on the hardware 14). The cassette interface 42 includes actuators and sensors that are associated with the clamps and sensor stations of the flow control cassette 34, and are configured to operate the clamps or sense characteristics of the fluid, respectively.

The reusable hardware 14 also includes a controller (not shown) that is configured to control operation of the system 10. The controller may include a microprocessor (which, in fact may include multiple physical and/or virtual processors) and one or more electrical circuits and memories. The instructions by which the microprocessor is programmed may be stored on the one or more memories associated with the microprocessor, which memory/memories may include one or more tangible non-transitory computer readable memories, having computer executable instructions stored thereon, which when executed by a microprocessor, may cause the microprocessor to carry out one or more actions as described below.

The controller may be coupled (i.e., directly or indirectly connected) to the equipment of the reusable hardware 14, such as the spinning membrane drive 36, the first syringe pump 38, the second syringe pump 40, and the cassette interface 42. The controller may operate each of these devices, each of which may be an assembly of other devices or equipment, to cause the fluid to flow through the fluid circuit 12 associated with the hardware 14, for example to cause fluid to flow from the source container 16, through the spinning membrane 18, and eventually into the product container(s) 20. The controller may be programmed to perform other actions as well, such as to test the fluid circuit 12, to prime the fluid circuit 12, to rinse parts of the circuit 12 after the wash has been performed, to add other components to the cell-containing fluid before that fluid is distributed to the product containers 20, and to distribute the cell-containing fluid into the product containers 20.

As illustrated, the embodiment of the system 10 includes a table 44 on which the container 32 is disposed to oscillate therewith. The table 44 may be mounted on a motor-drive shaft 46 that permits the table 44 to oscillate about an axis 48. The controller may control the table 44 (via a motor) to cause the table 44 to oscillate to agitate the contents of the container 32, encouraging mixing of the contents. This agitation may be performed, for example, while a cryoprotective agent (CPA) solution is being added to the container 32. The agitation may be continued for an additional time after the CPA solution has been added to encourage adequate mixing. The table 44 also may include a cooling or heating element that permits the material in the container 32 to be maintained at a particular temperature.

According to the illustrated embodiment, the contents of the container 32 are filled into one or more product containers 20 that are attached to the circuit 12. The system 10 may include a weigh scale assembly 50 for weighing the contents of the container(s) 20.

The system 10 may include other equipment as part of the hardware 14, in addition to the equipment already discussed. For example, the system 10 may include a display 52 with touch screen 54 to permit information to be entered into the system, including information regard the protocol of the procedure to be carried out by the system 10. The display 52 may be an electronic display, for example, with the touch screen 54 mounted thereon. Other input devices may be included, such as a pointer (for example, mouse) and keyboard or keypad. Also, as illustrated in FIG. 1, an input device in the form of a barcode reader 56 may be attached to the system 10 to permit information to be inputted into the system 10 (and the controller) by scanning or reading a barcode, such as may be applied to the fluid circuit 12 or one or more of the containers 16, 20, 26, 28, 30, 32. Other output devices also may be included, such as one or more lights (for example, light emitting diodes or bulbs) 57, which may be used to signal alerts, events or machine states to the operator.

Further details as to the system 10 and its operation may be found in the above-referenced US Publication No. 2021/0046426.

In keeping with the disclosure, and with reference to FIGS. 2-6, the weigh scale assembly 50 comprises a load cell 58 (best seen in FIGS. 4 and 5) that is mounted within a two-part housing 60, comprising a top 62 and a bottom 64, with the housing 60 being pivotally secured to the reusable processing machine 14 by means of a mount arm 66.

To support a container to be weighed on the load cell 58, a bracket 68 is secured to the load cell by, for example, screws 70. A container support clip 72 comprising a base 74 having a movable jaw 76 pivotally secured thereto by pivot 77 is suspended from the bracket 68 by means of a connection shaft 78. The container support clip 72 is secured to the connection shaft 78 by means of an elongated retaining screw 80 that extends through a central bore 82 in the connection shaft 78 and is received in an internally threaded aperture 84 in the base of the container support clip 72. The movable jaw 76 is biased into engagement with the base 74 by means of, for example, a torsion spring 86, with one or both of the inter-engaging gripping surfaces 88, 90 of the respective base 74 and jaw 76 being provided with surface features that enhance the grip of the support clip 72 on a container (such as container 20) that is held thereby. For example, the inter-engaging gripping surfaces of the base and jaw may be formed with complementarily-shaped features.

In keeping with the disclosure, the connection shaft 78 self-centers with respect to the bracket 68 so that no part of the weigh scale assembly or a container held by the weigh scale assembly touches any components that may unload (or reduce the load measured by) the load cell 58, and prevents lifting or detachment when removing a container from the weigh scale 50. To self-center, the container support clip 72 needs to be able to float or pivot to permit both side-to side movement ("roll", or movement about the X axis) and front-to-back movement ("pitch" or movement about the Y axis). Because self-centering of the load relative to the load cell 58 is driven by gravity, the amount of roll and pitch will never be beyond orthogonal to gravity, and thus is limited to less than 180° (+/−90°). However, in practice, roll and pitch is limited to far less. In addition, rotational movement of the container support clip 72 (i.e., "yaw", or movement about the Z axis) also may be limited to avoid interference from, for example, the twisting of tubing associated with a container held in the support clip. Preferably, rotation about the Z axis is limited to less than a full rotation, and is preferably limited to less than 180°, and more preferably is minimized as much as possible.

Accordingly, the connection shaft 78 is formed with an upper end 92 configured to be received in the bracket 68 so as to permit the container support clip 72 to move with two degrees of freedom relative to orthogonal axes (the X and Y axes) located in a horizontal plane of the bracket. To this end, and with reference to FIGS. 5 and 6, the upper end 92 of the connection shaft 78 has a hemispherical feature 94 that sits in a complementarily-shaped hemispherical feature 96 in the bracket. The hemispherical feature 94 on the connection shaft 78 is flattened on two opposing sides to form vertically-oriented planar side walls 98, with the bracket having corresponding planar walls 100 extending past the tangency, thus limiting yaw of the container support clip 72.

The connection shaft 78 also has an undercut 102 below the hemispherical feature 94 so that when the user lifts upward on the assembly of the connection shaft 78 and support clip 72, the primary diameter 104 of the connection shaft engages the bracket 68 and prevents further lifting. The opening 106 in the housing 60 through which the connection shaft 78 passes also is sufficiently larger than the primary diameter 104 of the connection shaft 78 to prevent the connection shaft 78 from unloading due to contacting the housing 60.

To install the connection shaft 78 into the bracket 68, the bracket 68 has a slot 108 extending from the center of the hemispherical feature 96 parallel to the flat walls 100, creating an opening in the edge. The underside of this edge is chamfered at 110 to allow the connection shaft 78 to be angled in, given the undercut 102 on the connection shaft 78.

Figure 2:
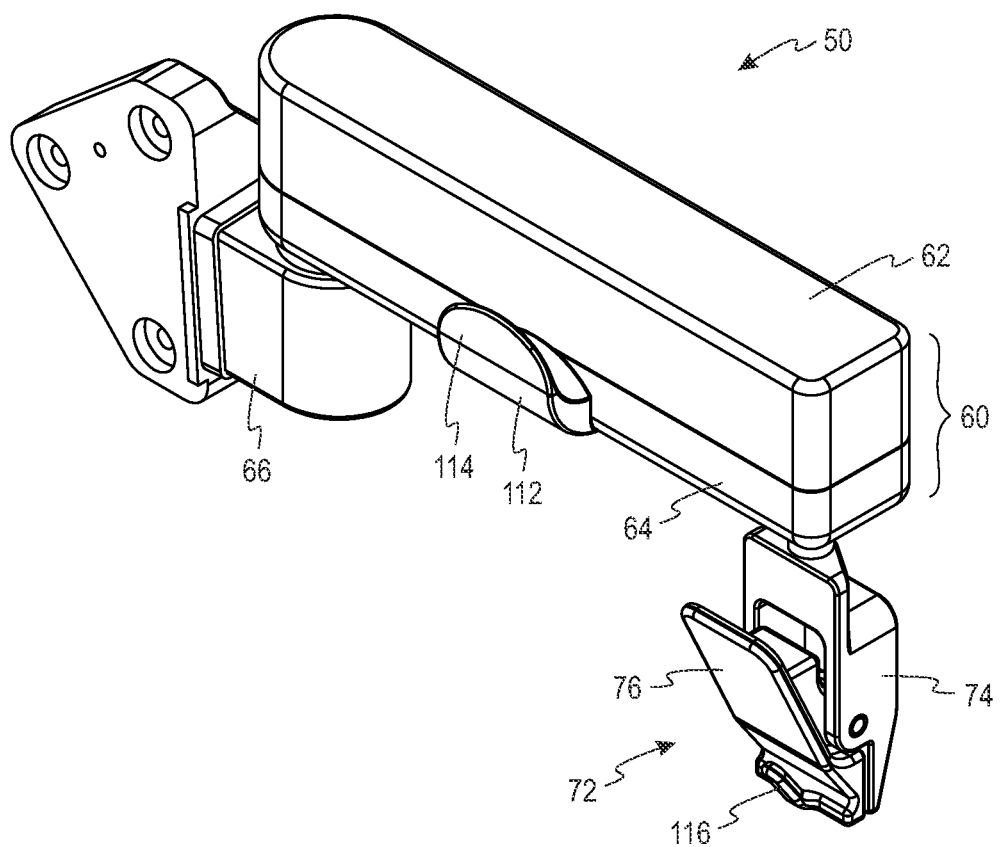
FIG. 2 is an enlarged perspective view of the weigh scale and container support system that is seen in FIG. 1.
Figure 3:
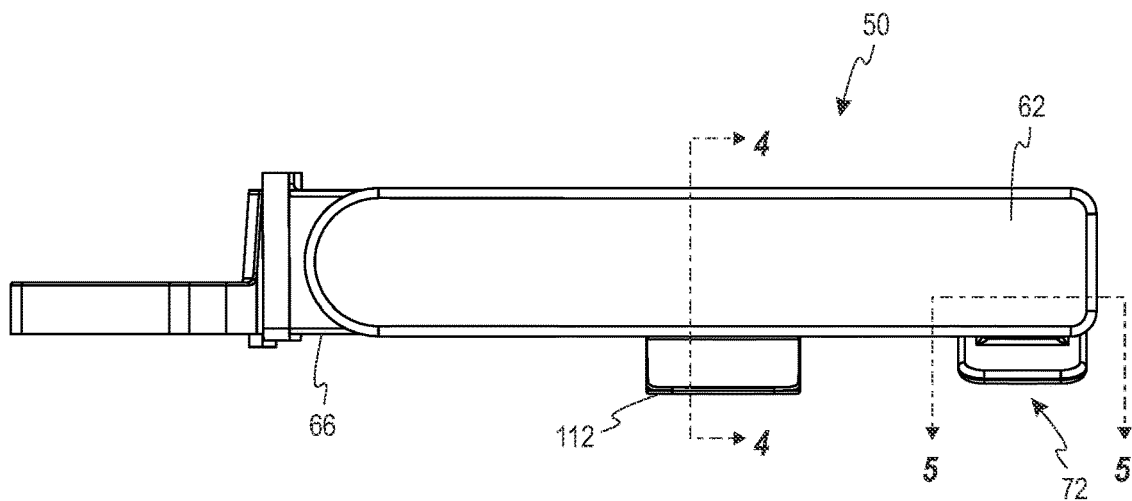
FIG. 3 is top view of the weigh scale and container support system of FIG. 2.
Figure 4:
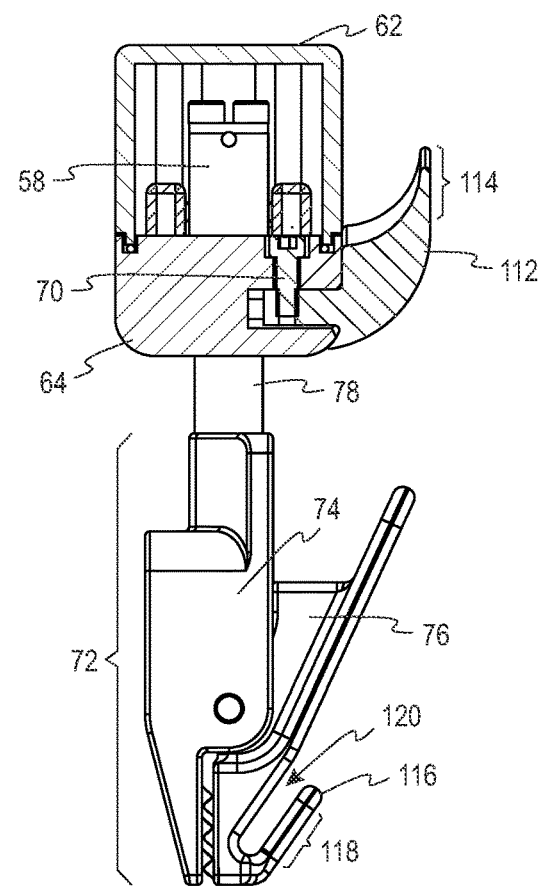
FIG. 4 is a cross-sectional view of the weigh scale and container support system taken along line 4-4 of FIG. 3.
Figure 5:
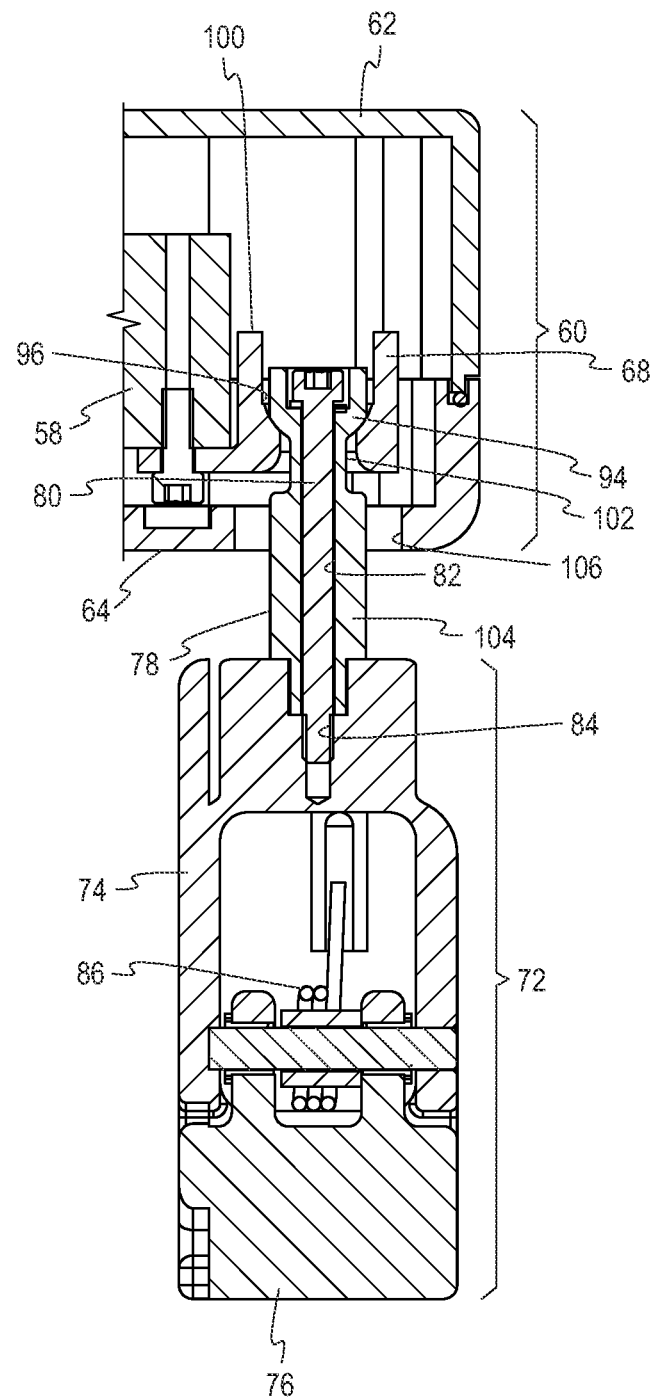
FIG. 5 is a cross-sectional view of the weigh scale and container support system taken along line 5-5 of FIG. 3.
Figure 6:
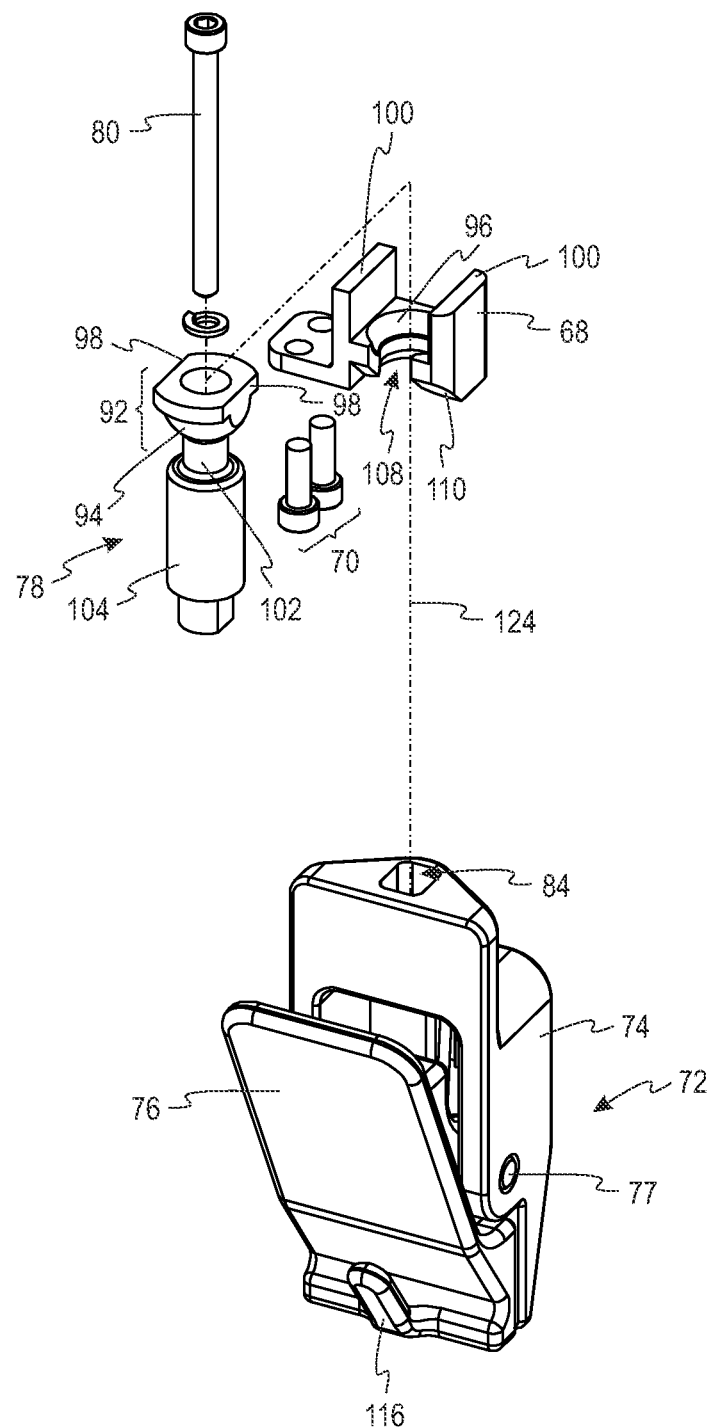
FIG. 6 is a partially exploded perspective view of the container support system seen in FIGS. 2-5.
Figure 7:
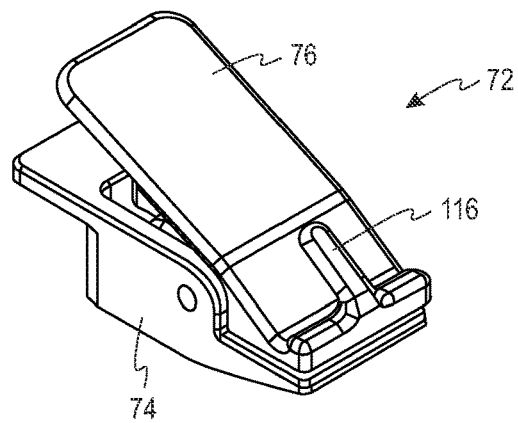
FIG. 7 is a perspective view of a bag retaining clip that forms part of the container support system.
Figure 8:
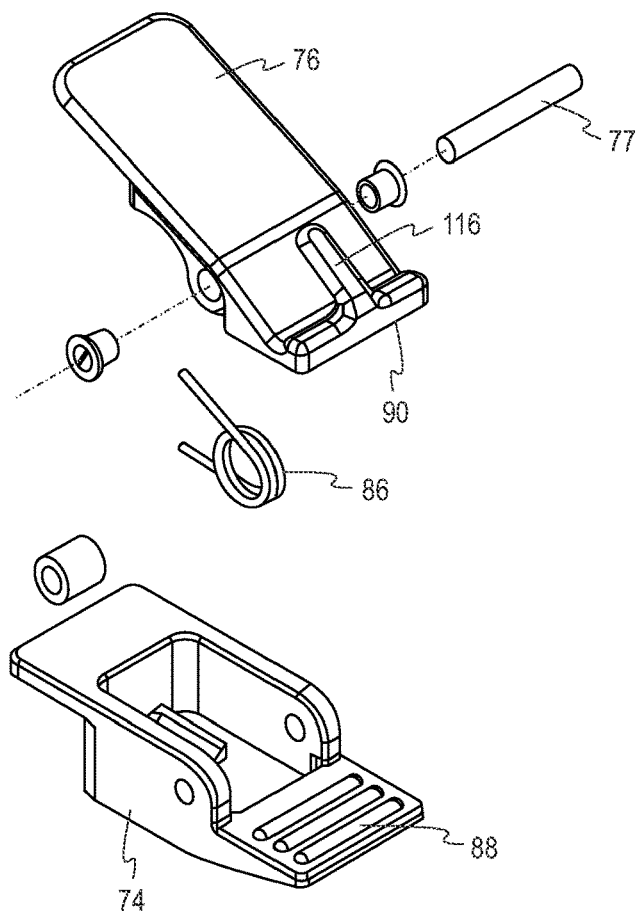
FIG. 8 is an exploded perspective view of the bag retaining clip of FIG. 7.

In keeping with another aspect of the disclosure, the weigh scale assembly 50 is provided with a tubing retainer or guide to control the tubing segment connected to a product container held by the container support clip in a consistent way to ensure accurate weighing of the product container. With reference to FIGS. 2-4, a tubing retainer or guide 112 is provided on an exterior face of the housing 60. The tubing retainer 112 is in the form of a tray that is open upwardly so as to form a generally U-shaped cross section with the exterior face of the housing (best seen in FIG. 4), with the upper portion 114 being sized to receive a tubing segment and an associated common tubing accessory of typical size (such as a Roberts clamp) associated with a product container held by the container support clip 72 (as seen in FIG. 1).

Further, the container support clip may include an upwardly-extending finger or hook 116. The hook 116 may provide for more accurate absolute measurement of weight by being used to hang a calibrated weight from the container support clip for consistently calibrating the load cell. The hook 116 also provides an option of hanging a bag that has a hole or a slot formed therein to provide a more secure hold or for processes that require greater repeatability, for example, calibrating the syringe pumps to a fluid volume as measured by the weigh scale. Use of the hook 116 for this process, rather than the container support clip 72, reduces miniscule errors caused by inconsistency in the placement of the bag in the jaws of the support clip 72, and applies the load to the same point at which the load cell 58 was calibrated.

Figure 9:
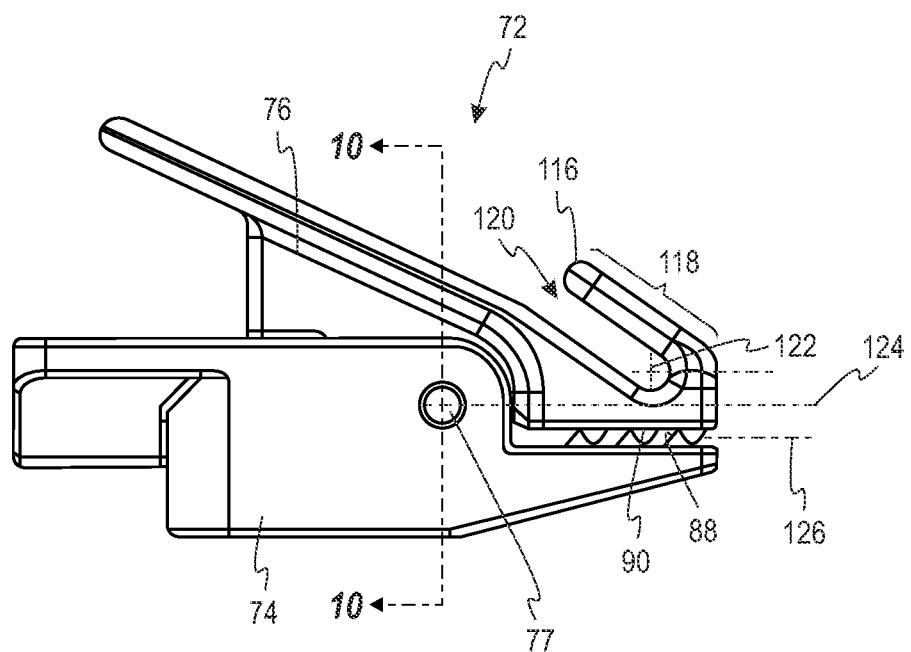
FIG. 9 is a side view of the bag retaining clip of FIG. 7.
Figure 10:
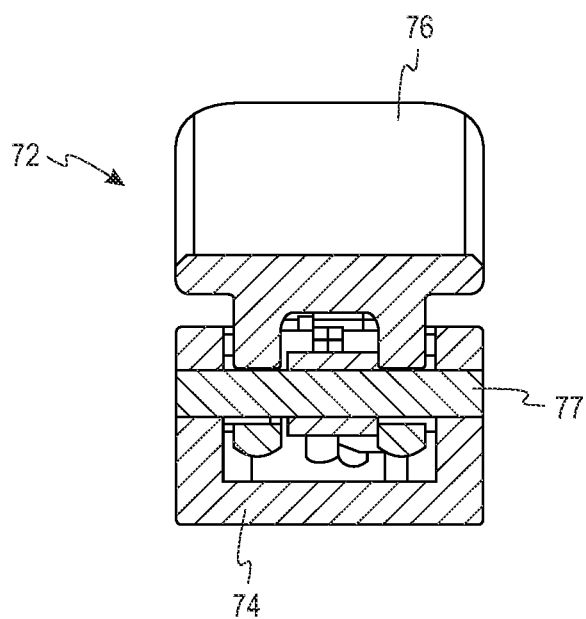
FIG. 10 is a cross-sectional view of the bag retaining clip taken line 10-10 of FIG. 9.

In an exemplary embodiment, the hook 116 has a width of approximately 0.25 inches, which corresponds to the common size of a hole in the bags and to the width of the other hooks for hanging bags that are associated with the reusable hardware component 14. With reference to FIG. 9, the center 122 of the slot 120 of the hook 116 and a plane 126 defined by the griping surfaces 88, 90 are equidistant from an axis of the container support clip pivot 77 and a vertical axis 124 of the connection shaft 78, so the calibration is optimized and sufficiently accurate for relative measurements.

Thus, an improved weigh scale for use with fluid processing systems has been provided that accommodates a wide variety of container configurations that is convenient and intuitive to use and permits quick installation and removal of a container by a single user and permits the user to see and manipulate the container as it is filling and during air removal. The descriptions provided above are intended for illustrative purposes, and are not intended to limit the scope of the disclosure to any particular method, system, apparatus or device described herein.

The invention claimed is:

1. A weigh scale for use with a fluid processing system comprising a reusable hardware component and a single use fluid flow circuit comprising a plurality of containers interconnected by a plurality of tubing segments, the weigh scale comprising:
   a) a load cell;
   b) a bracket secured to the load cell; and
   c) a container support clip secured to a connection shaft, the connection shaft having an upper end configured to be received in the bracket so as to permit the container support clip to self-center with respect to the bracket; and
   d) wherein the upper end of the connection shaft extends outwardly and has a hemispheric-shaped lower portion and an upper portion comprising generally flat, vertically-oriented side walls, and the bracket has complementarily-shaped surfaces for receiving the upper and lower portions of the upper end of the connection shaft, with the hemispheric-shaped lower portion permitting the container support clip to move with two degrees of freedom relative to orthogonal axes located in a horizontal plane of the bracket and the generally flat, vertically-oriented side walls of the upper portion limiting rotation of the container support clip about the vertical axis of the connection shaft.

2. The weigh scale of claim 1 wherein the upper end of the connection shaft is configured to be received in the bracket so as to permit the container support clip to move with two degrees of freedom relative to orthogonal axes located in a horizontal plane of the bracket.

3. The weigh scale of claim 1 wherein the upper end of the connection shaft is further configured to limit rotation of the container support clip about a vertical axis of the connection shaft.

4. The weigh scale of claim 1 wherein the container support clip comprises an internally-threaded aperture and the container support clip is secured to the connection shaft by an externally-threaded retaining screw received by the internally-threaded aperture of the container support clip.

5. The weigh scale of claim 1 further comprising a mount arm to which a housing is secured, the mount arm being configured to be secured to the reusable hardware component of the fluid processing system.

6. The weigh scale of claim 1 further comprising a housing having an interior, wherein the load cell is secured to the interior of the housing.

7. The weigh scale of claim 1 further comprising a housing having an exterior, wherein a tubing retainer is provided on an exterior face of the housing.

8. The weigh scale of claim 7 wherein the tubing retainer comprises a tray that is open upwardly so as to form a generally U-shaped cross section with the exterior face of the housing, with an open upper end sized to receive a tubing segment of the single use fluid flow circuit and an associated common tubing accessory associated with the tubing segment.

9. The weigh scale of claim 1 wherein the container support clip comprises a base, and a movable jaw pivotally secured to the base and biased into engagement with the base.

10. The weigh scale of claim 9 wherein the base of the container support clip comprises an internally-threaded aperture and the container support clip is secured to the connection shaft by an externally-threaded retaining screw received by the internally-threaded aperture of the container support clip.

11. The weigh scale of claim 9 wherein the container support clip further comprises a hook.

12. The weigh scale of claim 11 wherein the hook is formed integrally with the movable jaw and extends upwardly therefrom.

13. The weigh scale of claim 9 wherein the base and the movable jaw have inter-engaging gripping surfaces.

14. The weigh scale of claim 1 wherein the container support clip further comprises a hook, wherein the hook further comprises a finger that extends upwardly from the movable jaw.

15. A weigh scale for use with a fluid processing system comprising a reusable hardware component and a single use fluid flow circuit comprising a plurality of containers interconnected by a plurality of tubing segments, the weigh scale comprising:
 a) a load cell;
 b) a bracket secured to the load cell;
 c) a container support clip secured to a connection shaft, the connection shaft having an upper end configured to be received in the bracket so as to permit the container support clip to self-center with respect to the bracket;
 d) a housing having an exterior, wherein a tubing retainer is provided on an exterior face of the housing; and
 e) wherein the tubing retainer comprises a tray that is open upwardly so as to form a generally U-shaped cross section with the exterior face of the housing, with an open upper end sized to receive a tubing segment of the single use fluid flow circuit and an associated common tubing accessory associated with the tubing segment.

16. The weigh scale of claim 15 wherein the base and the movable jaw have inter-engaging gripping surfaces.

17. A weigh scale for use with a fluid processing system comprising a reusable hardware component and a single use fluid flow circuit comprising a plurality of containers interconnected by a plurality of tubing segments, the weigh scale comprising:
 a) a load cell;
 b) a bracket secured to the load cell;
 c) a container support clip secured to a connection shaft, the connection shaft having an upper end configured to be received in the bracket so as to permit the container support clip to self-center with respect to the bracket; and
 d) wherein the container support clip comprises a base, and a movable jaw pivotally secured to the base and biased into engagement with the base.

18. The weigh scale of claim 17 wherein the base and the movable jaw have inter-engaging gripping surfaces.

19. A weigh scale for use with a fluid processing system comprising a reusable hardware component and a single use fluid flow circuit comprising a plurality of containers interconnected by a plurality of tubing segments, the weigh scale comprising:
 a) a load cell;
 b) a bracket secured to the load cell;
 c) a container support clip secured to a connection shaft, the connection shaft having an upper end configured to be received in the bracket so as to permit the container support clip to self-center with respect to the bracket; and
 d) wherein the container support clip further comprises a hook, wherein the hook further comprises a finger that extends upwardly from the movable jaw.

20. The weigh scale of claim 19 wherein the base and the movable jaw have inter-engaging gripping surfaces.

* * * * *